(12) United States Patent
Arslan

(10) Patent No.: US 7,796,686 B2
(45) Date of Patent: Sep. 14, 2010

(54) ADAPTIVE ULTRAWIDEBAND RECEIVER AND METHOD OF USE

(75) Inventor: Huseyin Arslan, Tampa, FL (US)

(73) Assignee: University of South Florida, Tampa, FL (US)

( * ) Notice: Subject to any disclaimer, the term of this patent is extended or adjusted under 35 U.S.C. 154(b) by 708 days.

(21) Appl. No.: 11/559,605

(22) Filed: Nov. 14, 2006

(65) Prior Publication Data

US 2007/0153881 A1 Jul. 5, 2007

Related U.S. Application Data

(60) Provisional application No. 60/736,591, filed on Nov. 14, 2005.

(51) Int. Cl.
 *H04B 17/00* (2006.01)
(52) U.S. Cl. .................. 375/224; 375/227; 375/230; 375/232; 375/229
(58) Field of Classification Search ............. 375/316, 375/224, 226, 230, 232
See application file for complete search history.

(56) References Cited

U.S. PATENT DOCUMENTS

| 7,099,422 | B2 * | 8/2006 | Hoctor et al. | 375/354 |
| 2004/0170218 | A1 * | 9/2004 | Molisch et al. | 375/147 |
| 2007/0010956 | A1 * | 1/2007 | Nerguizian et al. | 702/57 |

FOREIGN PATENT DOCUMENTS

WO WO 03/073630 * 9/2003

OTHER PUBLICATIONS

S. B. Giuseppe Durisi, "Comparison between coherent and noncoherent receivers for uwb communications," in EURASIP Journal on applied signal processing, 2004.

D. L. G. A. G. Klein, D. R. Brown III and C. R. J. Jr., "Rake reception for uwb communication systems with intersymbol interference," in Proc. IEEE Workshop on Signal Processing Advances in Wireless Communications, 2003.

J. R. F. Arjunan Rajeswaran, V. Srinivasa Somayazulu, "Rake performance for a pulse based uwb systems in a realistic uwb indoorchannel." 2003.

U. M. Sau-Hsuan Wu and C.-C. J. Kuo, "Multistage mmse receivers for ultra-wide bandwidth impulse radio communications," in International Workshop on Ultra Wideband Systems joint with Conference on Ultra Wideband Systems and Technologies, vol. WA1 Japan, May 2004, p. 4.

L. A. R. Qinghua Li, "Hybrid rake/multiuser receivers for uwb." Intel Labs, Intel Corporation, Tech. Rep., 2003.

(Continued)

*Primary Examiner*—Shuwang Liu
*Assistant Examiner*—Dhaval Patel
(74) *Attorney, Agent, or Firm*—Courtney M. Dunn; Molly L. Sauter; Smith & Hopen, P.A.

(57) ABSTRACT

In accordance with the present invention, novel methods for adaptive receiver design and related parameter estimation techniques for efficient and non-coherent reception of ultra-wideband signals are presented. Efficient estimation of maximum excess delay of the channel for enabling many useful adaptation techniques is additionally provided. Also, noise power estimation which significantly improves the performance of the receivers is presented.

30 Claims, 7 Drawing Sheets

OTHER PUBLICATIONS

C. K. Rushforth, "Transmitted-reference techniques for random or unknown channels," IEEE Trans. Inform. Theory, vol. 10, No. 39, Jan. 1964.

A. Hoctor and H. Tomlinson, "Delay-hopped transmitted-reference rf communications," in IEEE Conference on Ultra Wideband Systems and Technologies, May 2002, pp. 265-269.

F. A. Thomas Zasowski and A. Wittneben, An energy efficient transmitted-reference scheme for ultra wideband communications, in International Workshop on Ultra Wideband Systems joint with Conference on Ultra Wideband Systems and Technologies, Kyoto, Japan, May 2004.

S. Franz and U Mitra, "On optimal data detection for uwb transmitted reference systems," in Proc. IEEE Globecom Conf., vol. 2, Dec. 2003, pp. 744-748.

L.-M. A. Stephane Paquelet and B. Uguen, "An impulse radio asynchronous transceiver for high data rates," in International Workshop on Ultra Wideband Systems joint with Conference on Ultra Wideband Systems and Technologies, Japan, May 2004.

* cited by examiner

FIG. 2
(Prior Art)
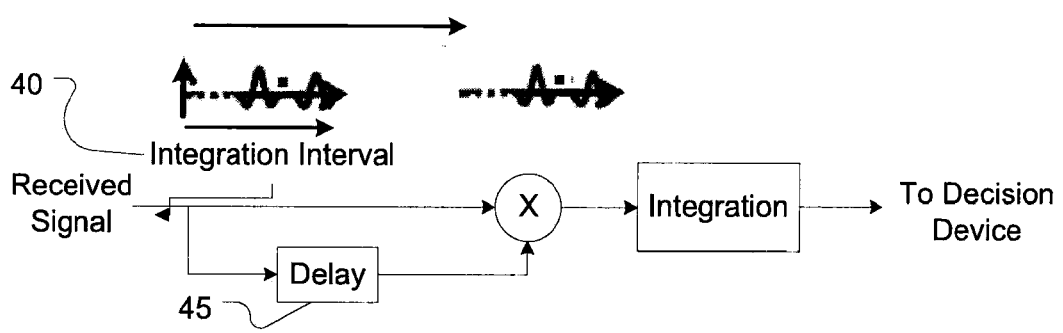
*a. A Simple Transmitted-Reference Receiver Structure*
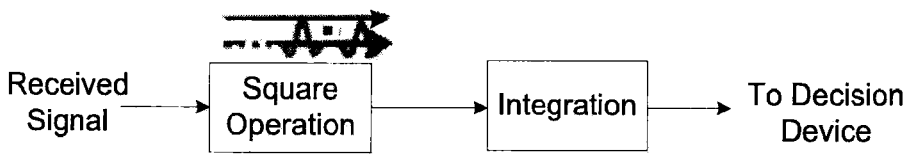
*b. Energy Detector*
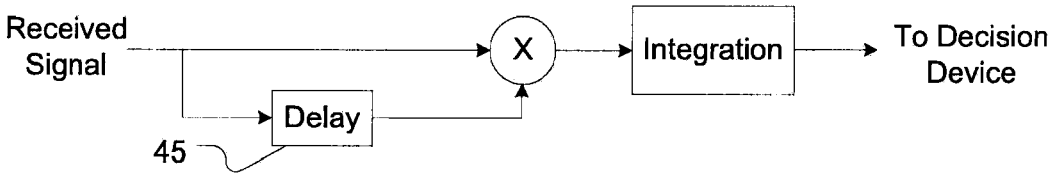
*c. DPSK Receiver Architecture*

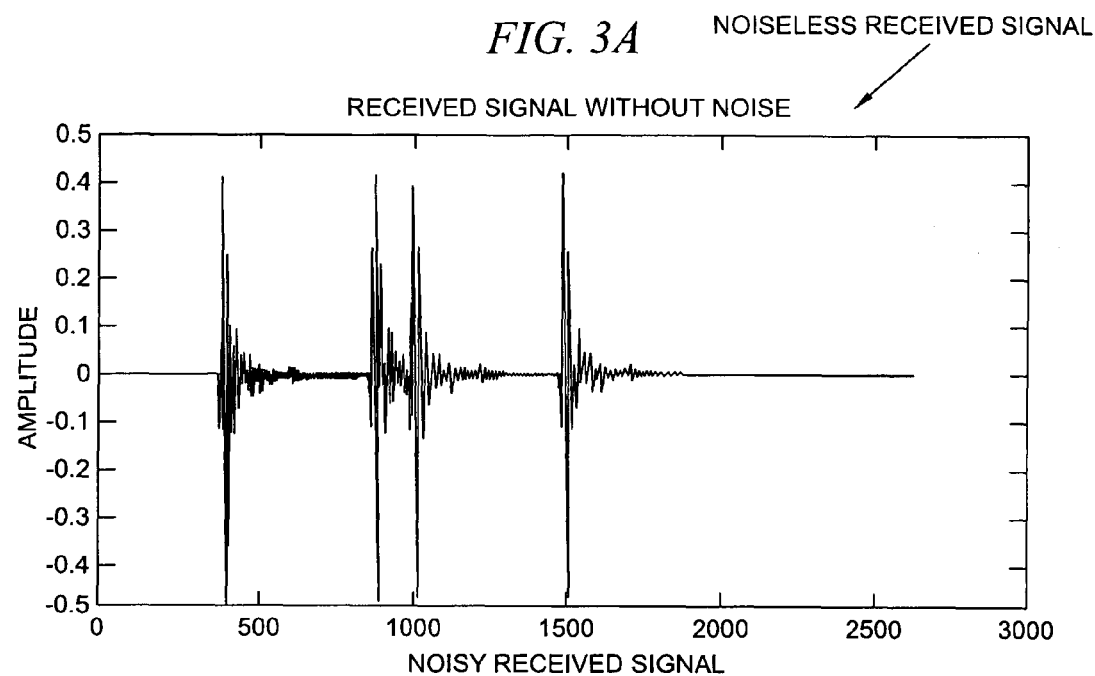
*FIG. 3A* NOISELESS RECEIVED SIGNAL
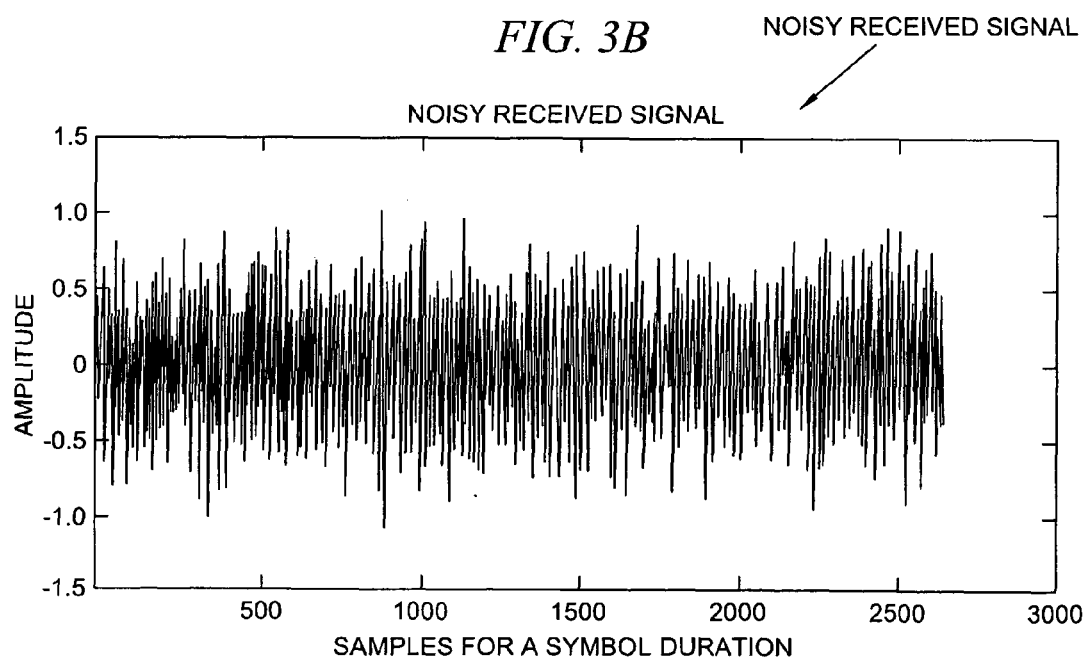
*FIG. 3B* NOISY RECEIVED SIGNAL

ADAPTIVE ULTRAWIDEBAND RECEIVER AND METHOD OF USE

CROSS REFERENCE TO RELATED APPLICATIONS

This application claims priority to U.S. provisional patent application No. 60/736,591, entitled: "Efficient and Adaptive Received Design for Ultrawideband Communication," filed Nov. 14, 2005, by the same inventor, the contents of which are herein incorporated by reference.

BACKGROUND OF THE INVENTION

As wireless communication systems are making the transition from wireless telephony to interactive internet data and multi-media types of applications, the desire for higher data rate transmission is increasing tremendously. As more and more devices go wireless, future technologies will face spectral crowding and coexistence of wireless devices will be a major issue. Considering the limited bandwidth availability, accommodating the demand for higher capacity and data rates is a challenging task, requiring innovative technologies that can coexist with devices operating at various frequency bands. Ultrawideband (UWB), which has been considered primarily for use with radar applications in the past, offers attractive solutions for many wireless communication areas, including wireless personal area networks (WPANs), wireless telemetry and telemedicine, and wireless sensors networks. With its wide bandwidth, UWB offers a capacity much higher than the current narrowband systems. While conventional narrowband communication systems employ radio frequency (RF) carriers of much higher frequency than the information rate required for transmitting baseband signals, UWB is a carrierless (baseband) transmission system. As such, UWB does not require the necessary up/down conversion of conventional communication systems, resulting in a much simpler solution and less expensive circuitry. Other benefits of UWB include immunity to multi-path effects, high resolution (sub-decimeter range), robustness against eavesdropping, and easier material penetration.

Simple, power efficient, low cost, and small sized UWB transceiver design is a challenging task. There are several receivers proposed for UWB communication. Fully coherent receivers, like rake receivers, and correlator receivers perform well but at the expense of extremely high computational and hardware complexity. In general, a coherent receiver requires several parameters regarding the received signal and radio channel. The multipath delays, the channel coefficients for each delayed multipath component and the distortion of the pulse shape need to be estimated for optimal coherent reception. Note that in UWB, the number of multipath components is very large and it is not uncommon for UWB to comprise hundreds of multipath components. Note also that given the total constant transmitted power, the power in each of these multipath components will be very low. Therefore, estimating the delays and coefficients from the received multipath components is an extremely challenging task. Therefore, receivers that relax these estimation requirements would be preferable.

Non-coherent receiver designs in UWB relax the amount of information that needs to be estimated accurately for the detection of the transmitted bits. In other words, the synchronization, channel estimation, and pulse shape estimation is not as stringent as in the case of the fully coherent receivers. Some of the non-coherent transceiver designs known in the art include a transmitted reference (TR) based UWB transceivers, an energy detector, and a differential detector. Common to all these non-coherent transceiver designs is that the channel estimation and received pulse estimation are not necessary. Also, the timing estimation is easier and the receiver performance is more immune to the timing mismatch.

FIG. 1 illustrates a coherent rake receiver 10 that is well known in the art. With a coherent rake receiver, the received signal energy over several multipath components 20 are captured with the correlators 15 at each finger and these fingers, or correlator outputs, are combined 25 to make a bit decision 30. The correlator 15 at each finger requires the templates 35 for the received pulse to match to the received signal's pulse. The correlators 15 in each finger need to be synchronized to the exact received multipath position. In the case of a coherent rake receiver 10 the optimal combining requires the channel coefficient and/or signal-to-noise-ratio estimates for efficient combining.

FIG. 2 illustrates three different non-coherent receivers currently known in the art. FIG. 2(a) illustrates TR-based receiver. FIG. 2(b) illustrates an energy detector and FIG. 2(c) illustrates a differential detector. In all these types, the integration time 40 is larger than the duration of the pulse. Often the integration time is on the order of the maximum excess delay of the channel. Note that none of these receivers require a local template to correlate the received signal. The TR-based receiver and differential detector correlate the signal with a delayed version of itself 45. In a TR-based receiver the delayed version of the signal is the known reference signal. In the differential detector, both of the signals are data, but, the decision is made on the difference of the correlated signal. Note that in non-coherent receivers the analog received signal is sampled after the integrator, often utilizing integrate-dump circuitry.

While the integration time in a non-coherent receiver should be large enough to accumulate all the signal energy, the integration should not be too large as to receive excess noise. The optimal integration time depends upon the maximum excess delay of the channel and the noise power. Accordingly, an efficient, accurate and low complex delay spread and/or maximum excess delay estimation is needed in the art to provide a non-coherent receiver that maximizes the data rate for a user while also reducing the inter-pulse interference of the signal.

SUMMARY OF INVENTION

In accordance with the present invention is provided a method of non-coherent ultrawideband communication, the method including the steps of, receiving an ultrawideband signal comprising a plurality of transmitted symbols at a plurality of parallel correlators, the signal having a predetermined pulse-to-pulse duration, correlating the ultrawideband signal with a delayed version of the ultrawideband signal using the plurality of parallel correlators, integrating the correlated signal utilizing a plurality of parallel integrators to establish a plurality of integrator outputs, each of the plurality of parallel integrators having an predetermined adaptable integration interval, sampling the integrator outputs and averaging the sampled outputs to provide a plurality of power estimates of the signal, estimating a noise power of the ultrawideband channel from the power estimates of the signal, estimating a maximum excess delay of the ultrawideband channel from the power estimates of the signal and combining the sampled integrator outputs based upon the estimated maximum excess delay and the estimated noise power of the channel to identify the transmitted symbols.

In an additional embodiment, the ultrawideband signal comprises a multipath delay and the adaptable integration intervals of the plurality of parallel integrators are adapted to cover a portion of the multipath delay.

The step of estimating the noise power of the channel may be accomplished utilizing one of two possible methods. A first method applicable when the maximum excess delay of the channel is always less than the pulse-to-pulse duration of the signal. The first method including the steps of integrating the signal utilizing an integration time interval that integrates the signal power from the maximum excess delay to the beginning of the next pulse to allow integration of the noise power of the channel only and repeating the integration step over a plurality of transmitted symbols and pulses and averaging the results of the integration steps to provide an estimate of the noise power. The second method applicable when the pulse-to-pulse duration of the transmitted signal is adapted and on-off keying modulation is employed to transmit the signal. The second method including the steps of inserting a plurality of zero training symbols into the transmitted signal and integrating the signal during the zero training symbols and estimating the noise power from the integrated signal.

In a specific embodiment, the estimate of the noise power is used to assist in the step of estimating a maximum excess delay of the channel to improve the accuracy of the maximum excess delay estimate.

With the method of the present invention, the pulse-to-pulse duration may be adapted based on the maximum excess delay of the channel to improve the performance and the data rate of the receiver.

Combining the sampled integrator outputs is based upon the estimated maximum excess delay and the estimated noise power of the channel further and may additionally comprise coherently combining the sampled integrator outputs. Various methods for combining the sampled integrator outputs are within the scope of the present invention, including, but not limited to, equal gain combining, maximal ratio combining, interference rejection combining, narrowband combining and multi-access interference rejection combining. An additional step may also be included whereby the combining weights for the integrator outputs are determined.

As a result of the method of the present invention, the receiver is inherently synchronized to the beginning and to the end of the received transmitted symbol.

Accordingly, the present invention provides a method of non-coherent ultrawideband communication, including the steps of receiving an ultrawideband signal having at least one transmitted symbol, correlating and integrating the received signal utilizing a plurality of parallel correlators and a plurality of parallel integrators, each of the plurality of correlators and integrators to capture a portion of the signal and coherently combining the captured portions of the signal to make a decision on the transmitted symbol.

The non-coherent ultrawideband receiver employed in accordance with the present invention may be based upon a transmitted-reference type receiver, an energy detector receiver, a differential detector receiver, or another non-coherent ultrawideband receiver known in the art.

Due to the high sampling rate requirements and other complexity constraints, many current practical UWB receiver designs are based on non-coherent receivers. These receivers employ analog front-end circuitry before the analog-to-digital-converter (ADC) and baseband signal processing. For example, analog multipliers (for correlating the signal with its delayed version) followed by analog integrate-and-dump circuitry are commonly used for TR-based and differential detectors. In an energy detector, an analog square device followed by analog integrate-and-dump circuit is used.

The integration interval in non-coherent receivers should be large enough to accumulate all the signal energy. On the other hand, the integration interval should not be too large to receive excess noise. The optimal integration interval depends on the maximum excess delay of the channel and noise power. Thus providing motivation to develop efficient, accurate and low complex delay spread and/or maximum excess delay estimation methods.

In addition, the maximum excess delay affects the pulse-to-pulse duration and if care is not taken inter-pulse-interference (IPI) can degrade the performance of the transceiver performance significantly. A simple IPI scenario is described with reference to FIG. 4. The present invention proposes adaptive pulse-to-pulse duration (adaptive frame size) based on the maximum excess delay estimate. This reduces the IPI while maximizing the data rates for a given user.

In addition, the present invention includes the use of multiple parallel integrators with shorter integration times instead of using a single integrator with a fixed (non-adaptive) integration time. These multiple integrator outputs will be used to make a decision on the transmitted symbols. The combining of multiple parallel integrators will be based on the maximum excess delay of the channel and noise variance estimation. FIG. 3 is a graphical illustration of a noisy and a noiseless received signal. Also, these multiple parallel integrator outputs are used for improving the timing synchronization. The parallel integrator outputs track the timing changes and adaptively fine tune to the accurate timing position for improving the performance of the receiver.

BRIEF DESCRIPTION OF THE DRAWINGS

For a fuller understanding of the invention, reference should be made to the following detailed description, taken in connection with the accompanying drawings, in which:

FIG. 2 is an illustration of three different receiver structures currently known in the art, a TR-based receiver, an energy detector and a differential detector.

FIG. 3 is a graphical illustration of a noisy and a noiseless received signal.

DETAILED DESCRIPTION OF THE PREFERRED EMBODIMENT

Figure 1:
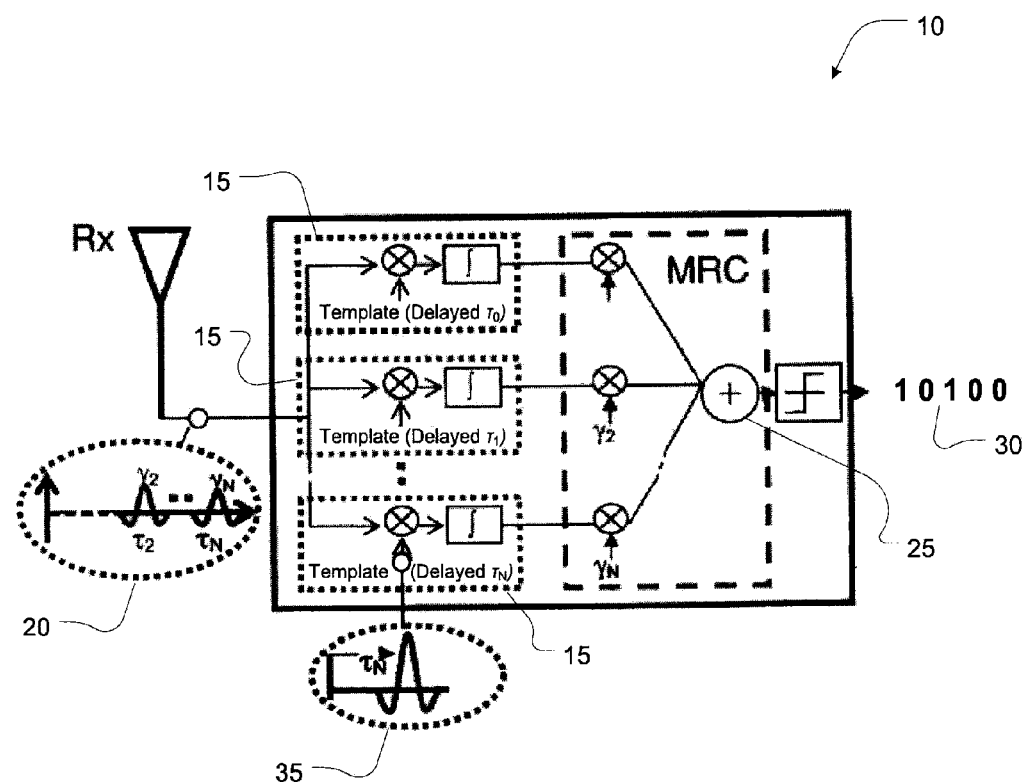
FIG. 1 is an illustration of a simple rake receiver structure currently known in the art.
Figure 4:
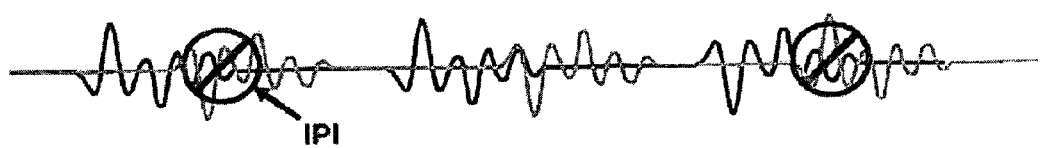
FIG. 4 is a representation of Inter-pulse interference (IPI) scenario.
Figure 5:
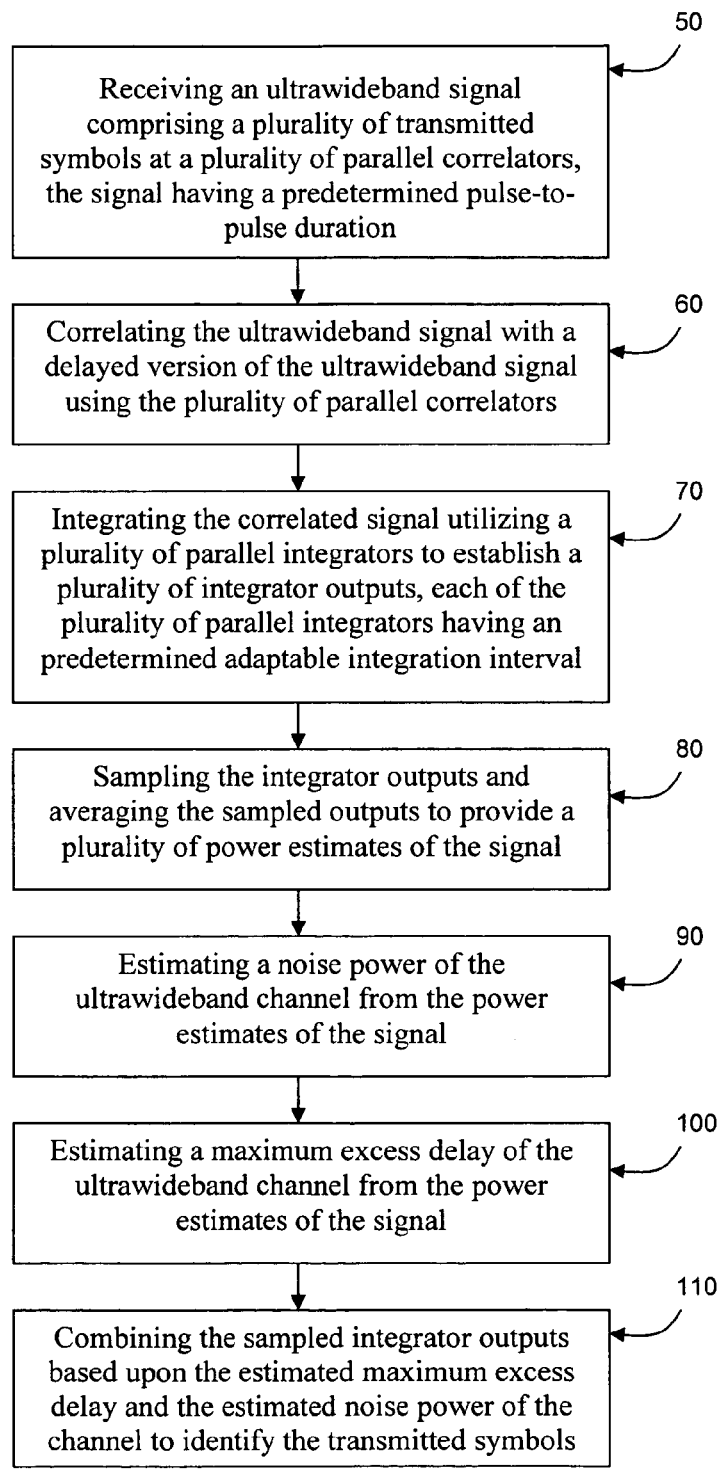
FIG. 5 is a flow diagram illustrating the method in accordance with the present invention.

With reference to FIG. 5, in accordance with an embodiment of the present invention a method of non-coherent ultrawideband communication is provided, the method including the steps of, receiving an ultrawideband signal comprising a plurality of transmitted symbols at a plurality of parallel correlators, the signal having a predetermined pulse-to-pulse duration 50, correlating the ultrawideband signal with a delayed version of the ultrawideband signal using the plurality of parallel correlators 60, integrating the correlated signal utilizing a plurality of parallel integrators to establish a plurality of integrator outputs, each of the plurality of parallel integrators having an predetermined adaptable integration interval 70, sampling the integrator outputs and averaging the sampled outputs to provide a plurality of power estimates of the signal 80, estimating a noise power of the ultrawideband channel from the power estimates of the signal 90, estimating a maximum excess delay of the ultrawideband channel from the power estimates of the signal 100 and combining the sampled integrator outputs based upon the estimated maximum excess delay and the estimated noise power of the channel to identify the transmitted symbols 110.

The output of a single integrator is not sufficient to estimate maximum excess delay of channel and noise variance. In accordance with the present invention, multiple parallel integrators (with shorter integration times) can be employed to estimate the maximum excess delay of the channel and the noise variance. The integrators are adapted to cover different parts of the multipath delays. Also, an integrator is allowed to cover beyond the maximum excess delay of the channel (mainly for noise variance estimation). From these integrator outputs, decision is made about the maximum excess delay of the channel and noise variance. Note that these decisions are specific to the receiver type. For example, the decision will be different for TR-based scheme than the energy detector. However, the idea can be applied to various types of non-coherent receivers.

To make a decision on maximum access delay of the channel, the sampled outputs of the parallel integrators are averaged over several pulses and possible symbols. The averaging will reduce the effect of noise and the integrator outputs will have distributions (different distribution depending on the receiver implementation) with different means (nonzero means). The means are identified by averaging. The mean values provide information about the energy/power of the signal over the parallel integrators. These power/energy estimates are then used to make a decision on noise variance and maximum excess delay estimate.

Figure 6:
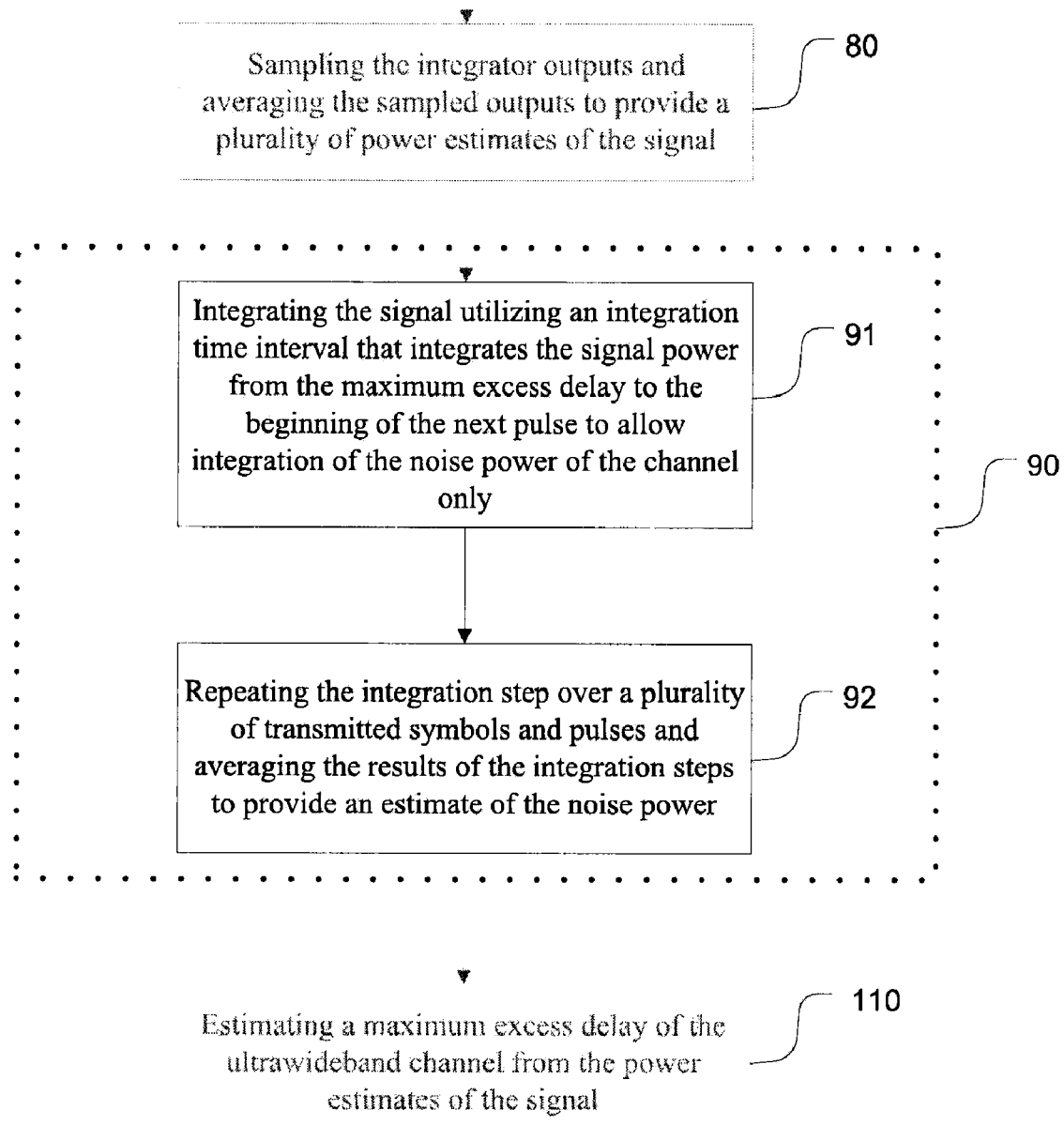
FIG. 6 is a flow diagram illustrating an embodiment of noise power estimation in accordance with the present invention.

For noise power estimation, two possible embodiments are provided in accordance with the present invention. In one approach, illustrated in FIG. 6, where the maximum excess delay of the channel is always less than the pulse-to-pulse duration, an integrator is used that integrates the signal power from the maximal excess delay (at the point where the signal is no longer exists) to the beginning of the next pulse 91. This way, only the noise power is integrated. It is necessary to average this over many pulses and for many symbols to obtain a more reliable estimate of the noise power 92.

Figure 7:
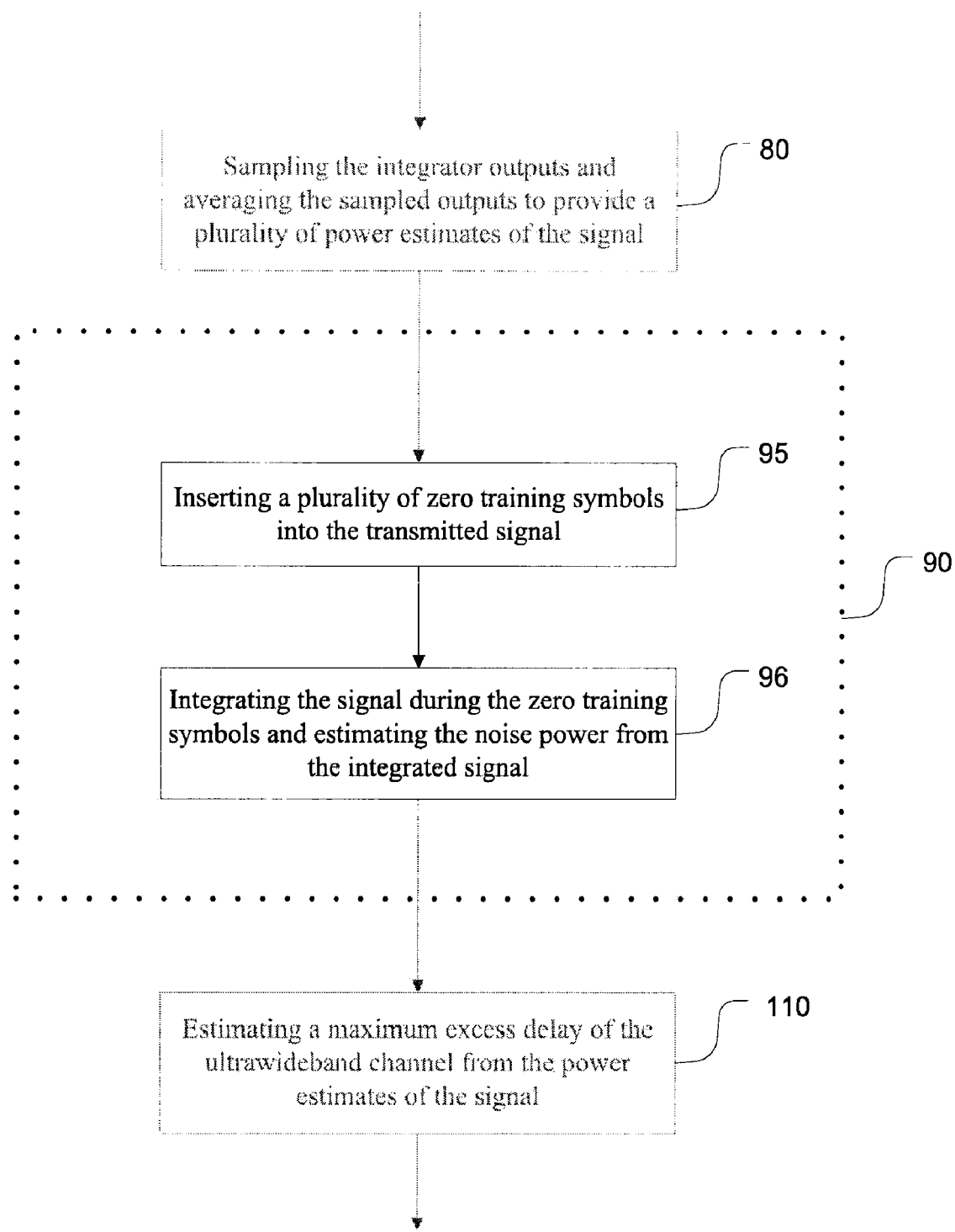
FIG. 7 is a flow diagram illustrating an additional embodiment of noise power estimation in accordance with the present invention.

In a second approach for estimating the noise power, illustrated in FIG. 7, if the pulse-to-pulse duration is adapted and on-off keying modulation is used at the transmitter, then regularly inserted training symbols of zero (off) can be inserted to the transmitted signal 95. When the transmitter is OFF (i.e. transmitting zero), then the outputs of the integrators over this symbol time can be used to estimate the noise power 96.

Once the noise power is determined, this information can also be used to help the calculation of the maximum excess delay of the channel. The maximum excess delay can be determined based solely from all the integrator outputs without the knowledge of the noise power estimate. However, a more reliable decision can be made if the noise power estimation is also used in the decision. Once a decision on maximum excess delay of the channel is made, the performance and data rate of the transceiver can be improved by adapting the pulse-to-pulse duration. If the pulse-to-pulse duration is shorter than the maximum excess delay of the channel IPI (inter-pulse interference) will be observed. If it is too large, then the maximal data rate for a user will not be high. Adaptive design will make sure that high data rates are obtained while keeping the IPI at a minimum.

The symbol decisions will be based on the combination of these integrator outputs. Note that since digital samples are being used for the combining, optimal combining techniques can be employed, such as maximal ratio combining, interference rejection combining, etc. The power differences at the correlator outputs will be used for efficient combining. Note that as well as the total power, the noise power over all these correlator outputs can be estimated by using OOK modulation and the second noise variance estimation technique mentioned above. This way, the signal-to-noise-ratio in each correlator output can be estimated and maximal ratio combining can be employed efficiently. Taking this one step further, the noise correlation can be estimated across the parallel correlator outputs if the noise also includes interference. The noise correlation can be used for interference rejection combining.

The present invention also provides for the tracking of the timing position using the parallel integrator approach. The single integrator approach does not allow for tracking of the timing position. However, a parallel integration approach that includes additional short time integrations beyond the multipath components of the received signal period (i.e. the total combined integration time is larger than the maximum excess delay of channel) will be able to track the fine timing position. Note that additional integrators "early" (before the estimated first multipath component) and "late" (after the last multipath component) are required for efficient tracking.

In accordance with the present invention, adaptation is inherent on the collection of multipath components. The multiple energy components, due to the integration of the multipath, are combined adaptively depending on the energy on each of these components and also depending upon the noise as well as the interference power. In general terms, instead of having a single correlator and integrator for the whole maximum excess delay of the channel, the present invention provides for multiple correlators and integrators. Each of these correlator/integrators will try to capture part of the signal that is being received. Then, the multiple signal contributions are coherently combined to arrive at the decision result.

In addition, the present invention also adapts the maximum excess delay of the channel. The overall integration is adapted and with the present invention even if the location where the energy block starts and ends in the received signal is unknown, the proposed method in accordance with the present invention automatically adjusts the location. As such, the proposed method also automatically synchronizes with the signal.

Also, the interference rejection combining of the integrator outputs provides additional benefits. Interference rejection combining has been applied to multiple antenna systems. The outputs of the integrators are interpreted as antenna elements (which is a very realistic assumption), similar approaches can be implemented here as well. As a result, multiple access interference and narrowband interference capabilities can be introduced.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described.

What is claimed is:

1. A method of non-coherent ultrawideband communication, the method comprising the steps of:
   receiving, by a receiver, a received signal comprising an ultrawideband signal and noise, the ultrawideband signal comprising a plurality of transmitted symbols and, having a predetermined pulse-to-pulse duration, the transmitted symbols received at a plurality of parallel correlators;
   correlating the ultrawideband signal with a delayed version of the ultrawideband signal using the plurality of parallel correlators to produce a correlated signal;
   integrating the correlated signal utilizing a plurality of parallel integrators to establish a plurality of integrator outputs, each of the plurality of parallel integrators having a predetermined adaptable integration interval;
   sampling the integrator outputs and averaging the sampled outputs to provide a plurality of power estimates of the ultrawideband signal;
   estimating a maximum excess delay of the ultrawideband channel from the power estimates of the ultrawideband signal;
   integrating the received signal utilizing an integration time interval that integrates a signal power from the maximum excess delay of the ultrawideband channel to the beginning of a next pulse to allow integration of a noise power of the channel only, responsive to the maximum excess delay of the ultrawideband channel always being less than the pulse-to-pulse duration of the ultrawideband signal;
   repeating the integration step over the plurality of transmitted symbols and over a plurality of pulses;
   averaging the results of the integration steps to provide an estimate of the noise power of the ultrawideband channel;
   combining the sampled integrator outputs based upon the estimated maximum excess delay of the ultrawideband channel and the estimated noise power of the ultrawideband channel to identify the plurality of transmitted symbols.

2. The method of claim 1, wherein the ultrawideband signal comprises a multipath delay and the adaptable integration intervals of the plurality of parallel integrators are adapted to cover a portion of the multipath delay.

3. The method of claim 1, wherein the estimate of the noise power is used to assist in the step of estimating a maximum excess delay of the channel.

4. The method of claim 1, wherein the pulse-to-pulse duration is adapted based on the maximum excess delay of the channel to improve the performance and the data rate of the receiver.

5. The method of claim 1, wherein the step of combining the sampled integrator outputs based upon the estimated maximum excess delay and the estimated noise power of the channel further comprises coherently combining the sampled integrator outputs.

6. The method of claim 1, wherein the sampled integrator outputs are combined using equal gain combining.

7. The method of claim 1, wherein the sampled integrator outputs are combined using maximal ratio combining.

8. The method of claim 1, wherein the sampled integrator outputs are combined using interference rejection combining.

9. The method of claim 1, wherein the sampled integrator outputs are combined using narrowband combining.

10. The method of claim 1, wherein the sampled integrator outputs are combined using multi-access interference rejection combining.

11. The method of claim 1, further comprising the step of, estimating a plurality of combining weights for the integrator outputs.

12. The method of claim 1, further comprising the step of, inherently synchronizing the receiver to the beginning and to the end of the received symbol.

13. The method of claim 1, wherein the receiver is a transmitted-reference type receiver.

14. The method of claim 1, wherein the receiver is an energy detector receiver.

15. The method of claim 1, wherein the receiver is a differential detector receiver.

16. A method of non-coherent ultrawideband communication, the method comprising the steps of:
   receiving, by a receiver, a received signal comprising an ultrawideband signal and noise, the ultrawideband signal comprising a plurality of transmitted symbols and having a predetermined pulse-to-pulse duration, the transmitted symbols received at a plurality of parallel correlators;
   correlating the ultrawideband signal with a delayed version of the ultrawideband signal using the plurality of parallel correlators to produce a correlated signal;
   integrating the correlated signal utilizing a plurality of parallel integrators to establish a plurality of integrator outputs, each of the plurality of parallel integrators having a predetermined adaptable integration interval;
   sampling the integrator outputs and averaging the sampled outputs to provide a plurality of power estimates of the ultrawideband signal;
   inserting a plurality of zero training symbols into the ultrawideband signal, responsive to the pulse-to-pulse duration of the ultrawideband signal being adapted and on-off keying modulation being employed to transmit the ultrawideband signal;
   integrating the received signal during the zero training symbols to produce an integrated signal;
   estimating a noise power of an ultrawideband channel from the integrated signal;
   estimating a maximum excess delay of the ultrawideband channel from the power estimates of the ultrawideband signal; and
   combining the sampled integrator outputs based upon the estimated maximum excess delay of the ultrawideband channel and the estimated noise power of the ultrawideband channel to identify the plurality of transmitted symbols.

17. The method of claim 16, wherein the ultrawideband signal comprises a multipath delay and the adaptable integration intervals of the plurality of parallel integrators are adapted to cover a portion of the multipath delay.

18. The method of claim 16, wherein the estimate of the noise power is used to assist in the step of estimating a maximum excess delay of the channel.

19. The method of claim 16, wherein the pulse-to-pulse duration is adapted based on the maximum excess delay of the channel to improve the performance and the data rate of the receiver.

20. The method of claim 16, wherein the step of combining the sampled integrator outputs based upon the estimated maximum excess delay and the estimated noise power of the channel further comprises coherently combining the sampled integrator outputs.

21. The method of claim 16, wherein the sampled integrator outputs are combined using equal gain combining.

22. The method of claim 16, wherein the sampled integrator outputs are combined using maximal ratio combining.

23. The method of claim 16, wherein the sampled integrator outputs are combined using interference rejection combining.

24. The method of claim 16, wherein the sampled integrator outputs are combined using narrowband combining.

25. The method of claim 16, wherein the sampled integrator outputs are combined using multi-access interference rejection combining.

26. The method of claim 16, further comprising the step of, estimating a plurality of combining weights for the integrator outputs.

27. The method of claim 16, further comprising the step of, inherently synchronizing the receiver to the beginning and to the end of the received symbol.

28. The method of claim 16, wherein the receiver is a transmitted-reference type receiver.

29. The method of claim 16, wherein the receiver is an energy detector receiver.

30. The method of claim 16, wherein the receiver is a differential detector receiver.

* * * * *

UNITED STATES PATENT AND TRADEMARK OFFICE
CERTIFICATE OF CORRECTION

PATENT NO. : 7,796,686 B2  
APPLICATION NO. : 11/559605  
DATED : September 14, 2010  
INVENTOR(S) : Huseyin Arslan Page 1 of 1

It is certified that error appears in the above-identified patent and that said Letters Patent is hereby corrected as shown below:

On the Title Page, Item (54) and in the Specification, Column 1, Lines 1 and 2, Title should read:

ADAPTIVE ULTRAWIDEBAND RECEIVER METHOD

Signed and Sealed this
Tenth Day of September, 2013

Teresa Stanek Rea
*Acting Director of the United States Patent and Trademark Office*